United States Patent [19]
Williams

[11] Patent Number: 5,663,523
[45] Date of Patent: Sep. 2, 1997

[54] METHOD OF PROPELLING A PROJECTILE WITH AMMONIUM AZIDE

[75] Inventor: Laurence O. Williams, Colchester, Vt.

[73] Assignee: Martin Marietta Corporation, Bethesda, Md.

[21] Appl. No.: 669,920

[22] Filed: Jun. 25, 1996

Related U.S. Application Data

[62] Division of Ser. No. 262,452, Jun. 20, 1994, Pat. No. 5,565,646, which is a division of Ser. No. 911,537, Jul. 2, 1992, Pat. No. 5,487,798, which is a continuation of Ser. No. 492,954, Mar. 13, 1990, abandoned.

[51] Int. Cl.$^6$ ............................................. F42B 4/00
[52] U.S. Cl. ........................... 102/335; 102/347; 102/517
[58] Field of Search ............................. 102/347, 517, 102/335

[56] References Cited

U.S. PATENT DOCUMENTS

| | | | |
|---|---|---|---|
| 1,861,054 | 5/1932 | Hadfield et al. | 102/517 X |
| 2,965,466 | 12/1960 | Ball | 149/36 |
| 2,981,616 | 4/1961 | Boyer | 149/36 |
| 3,066,479 | 12/1962 | Koch, Jr. | 149/36 |
| 3,309,248 | 3/1967 | Rausch | 149/36 |
| 3,607,470 | 9/1971 | Lucas | 149/36 |
| 3,634,154 | 1/1972 | Burdette | 149/36 |
| 3,668,873 | 6/1972 | Bauman | 149/36 |
| 3,690,849 | 9/1972 | Bredzs et al. | 149/108.2 |
| 3,704,184 | 11/1972 | Kuehl et al. | 149/2 |
| 3,733,223 | 5/1973 | Lohkamp | 149/19.6 |
| 3,734,789 | 5/1973 | Moy et al. | 149/19.9 |
| 3,844,855 | 10/1974 | Plomer et al. | 149/19.1 |
| 3,861,138 | 1/1975 | Bridgeforth, Jr. et al. | 149/36 |
| 4,021,362 | 5/1977 | Channell et al. | 423/648 A |
| 4,022,705 | 5/1977 | Beckert et al. | 149/22 |
| 4,047,465 | 9/1977 | Wohlford | 102/430 |
| 4,187,129 | 2/1980 | Bost et al. | 149/36 |
| 4,234,363 | 11/1980 | Flanagan | 149/19.4 |
| 4,315,786 | 2/1982 | English et al. | 149/22 |
| 4,402,776 | 9/1983 | Whipps | 149/108.2 |
| 4,432,818 | 2/1984 | Givens | 149/22 |
| 4,468,263 | 8/1984 | Artz et al. | 149/22 |
| 4,753,172 | 6/1988 | Katzmann et al. | 102/517 X |
| 4,963,203 | 10/1990 | Halcomb et al. | 149/108.2 |
| 5,033,355 | 7/1991 | Goldstein et al. | 102/430 |
| 5,431,105 | 7/1995 | Wilkinson | 102/430 |
| 5,445,079 | 8/1995 | Boual | 102/517 X |

*Primary Examiner*—Peter A. Nelson
*Attorney, Agent, or Firm*—Burns, Doane, Swecker & Mathis, L.L.P.

[57] ABSTRACT

A propellant composition comprising an admixture of a first hydrogen rich material and a second metal material which is capable of reacting exothermically with the first material. The ratio of the first material to the second material is selected such that the exothermic reaction forms a solid phase and a gas phase which contains substantial amounts of hydrogen. Preferably, the first hydrogen rich material comprises a material capable of providing nitrogen upon decomposition thereof, and the second metal material comprises a material capable of reacting exothermically with the nitrogen generated by the decomposition of the first material such that the solid phase comprises a solid nitride of the second metal material.

In a preferred embodiment, the first material comprises ammonium azide, and the second material comprises boron, titanium, titanium hydride, or mixture thereof.

4 Claims, 7 Drawing Sheets

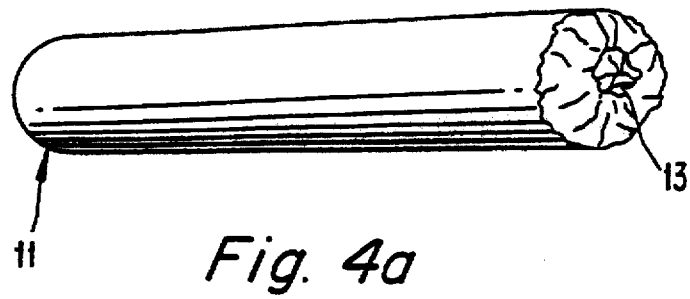
Fig. 4a
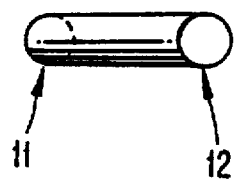
Fig. 4b
Fig. 5a
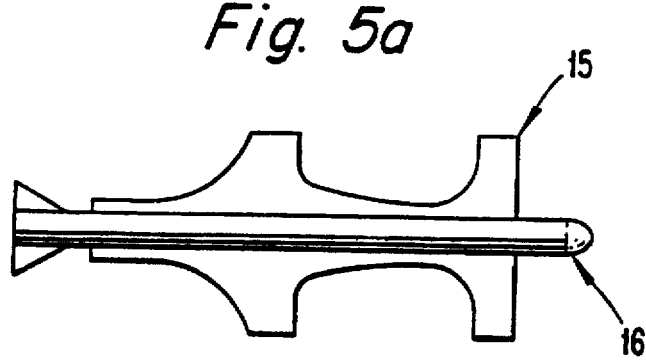
Fig. 5b
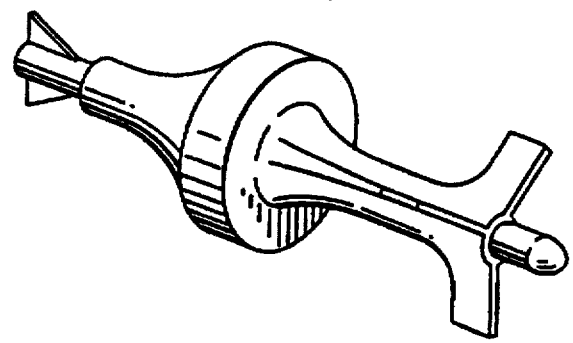

METHOD OF PROPELLING A PROJECTILE WITH AMMONIUM AZIDE

CROSS REFERENCE TO RELATED APPLICATION

This application is a divisional of application Ser. No. 08/262,452, filed Jun. 20, 1994, and now U.S. Pat. No. 5,565,646, which is a divisional of application Ser. No. 07/911,537, filed Jul. 2, 1992, now U.S. Pat. No. 5,487,798, granted Jan. 30, 1996, which is a continuation of application Ser. No. 07/492,954, filed on Mar. 13, 1990, and now abandoned.

BACKGROUND OF THE INVENTION

The present invention relates to a high velocity gun propellant.

A gun propellant is a chemical substance capable of reacting rapidly to produce a hot gas. When confined in the chamber and bore of a gun the hot gas generated by the propellant exerts a pressure on the base of the projectile accelerating it to a high velocity.

For a gun of fixed pressure rating and barrel length there is a characteristic velocity obtainable with a given projectile weight. For a heavy projectile the velocity is limited by the design pressure of the gun barrel and the total amount of energy and gas available from the propellant. For light projectiles the velocity is limited by the velocity that the propellant gas can follow the projectile down the bore continuing to apply pressure to its base.

The velocity with which the propellant gas can flow after the projectile and continue to accelerate it is determined by the speed of sound in the gas, i.e., the sonic velocity. The sonic velocity (V) of a gas is given by equation (1):

$$V = \left( \frac{\tau RT}{m} \right)^{1/2} \quad (1)$$

where $\tau$=the ratio of the gas specific heat at constant pressure ($c_p$) to the gas specific heat at constant volume ($c_v$), R=the universal gas constant $8.314 \times 10^7$ gram cm$^2$/sec$^2$°K mole, T=temperature in degrees Kelvin (°K) and m=the gram molecular weight of the gas. This expression indicates that the gas with high temperature (T) and low molecular weight would have the highest sonic velocity. Table 1 displays the sonic velocity for several gases at 2500° K.

TABLE 1

Theoretical Sonic Velocity of Gases at 2500° Kelvin

| Gas | $\tau$ | Molecular Weight (grams/mole) | Sonic Velocity (m/sec) |
|---|---|---|---|
| Nitrogen | 1.40 | 28 | 1019 |
| Carbon Dioxide | 1.23 | 44 | 762 |
| Carbon Monoxide | 1.29 | 28 | 978 |
| Water Vapor | 1.21 | 18 | 1182 |
| Helium | 1.66 | 4 | 2937 |
| Hydrogen | 1.32 | 2 | 3704 |

From Table 1 it can be seen that hot hydrogen has the highest sonic velocity and thus, in theory, would be an optimum gas to serve as the working fluid to achieve the highest velocity for a projectile.

Current ampellants produce a mixture of gas made up of various mounts of nitrogen, carbon dioxide, carbon monoxide, water vapor, and hydrogen. Solids produced in gun propellant reactions, such as these produced by black gun powder, have only a slight effect on the properties of the gas because during the rapid expansion involved in accelerating the projectile, the gas phase expands away from the solids and the gas behind the projectile that provides the acceleration is largely free of solids. Table 2 indicates the approximate concentration of the component of the gas phase and the resultant sonic velocity of two current propellants.

| Propel- | Mole % Gas | | | | | Solids | | Sonic |
|---|---|---|---|---|---|---|---|---|
| lant | $CO_2$ | CO | $N_2$ | $H_2O$ | $H_2$ | Vol % | Wt % | Velocity |
| Black Powder | 22.0 | 44.8 | 33.2 | 0 | 0 | .0095 | 51.2 | 944 |
| Nitrocellulose | 16.3 | 38.5 | 12.5 | 24.4 | 8.3 | 0 | 0 | 1223 |

From Table 2 it can be seen that nitrocellulose based propel/ants should provide higher velocities with light projectiles than does black powder. This is consistent with the velocity performance observed in the use of these two propellants.

Ammonium azide, has been known for over seventy years since its preparation by Curtus in 1890. Moreover, it has been employed in a number of environments, For example, Boyer, U.S. Pat. No. 2,981,616, discloses a composition of matter generating gases, which comprises a mixture of an azide, which may be ammonium azide, and an oxidizing compound.

Koch, Jr., U.S. Pat. No. 3,066,479, discloses a method of stabilizing an azide, which may be ammonium azide, and the resulting composition. The azide of this patent is stabilized by providing an excess of the base forming the cation, which, in the case of ammonium azide, is exemplified by anhydrous liquefied ammonia. The resulting azide composition is disclosed as being useful as a fuel gas in rockets, gas turbines or the like.

However, ammonium azide has not heretofore been utilized as a gun propellant either zone or in admixture, however, because it is commonly believed to be highly impact and friction sensitive.

Moreover, although traditional gun propellants are satisfactory for many applications, there remains a need for gun propellants capable of propelling projectiles at higher velocities and greater distances, thereby to inflict greater damage on intended targets.

Accordingly, it is an object of the present invention to provide a new and improved gun propellant.

It is also an object of the invention to provide a method of propelling a projectile, comprising igniting an effective amount of the new and improved propellant described herein, to fire the projectile from a gun at a desired velocity.

SUMMARY OF THE INVENTION

In accordance with the foregoing objectives, the present invention relates to an improved high velocity propellant. In particular, the propellant composition according to the present invention comprises an admixture of a first hydrogen rich material, which preferably provides nitrogen upon the decomposition thereof, and a second metal material which is capable of reacting exothermically with the first material, where the ratio of the first material to the second material is such that the exothermic reaction of the propellant forms a solid phase, preferably a solid nitride of the second metal material, and a gas phase containing hydrogen.

In another aspect, the present invention relates to an improved article of ammunition comprising a projectile, an amount of the high velocity propellant effective to propel the projectile at a predetermined velocity, and the casing confining the propellant adjacent to the projectile and which has a surface contacting the propellant which is inert with respect to the propellant.

The invention also entails a method of propelling a projectile, comprising igniting an effective amount of the propellant described herein, to fire the projectile from a gun at a desired velocity.

BRIEF DESCRIPTION OF THE DRAWINGS

FIGS. 2, 3, 4a, 4b, 5a and 5b represent a variety of projectiles in which the propellant to the present invention may be employed.

DETAILED DESCRIPTION OF THE PREFERRED EMBODIMENTS ACCORDING TO THE INVENTION

Figure 1A:
FIGS. 1a–1g illustrate a variety of shapes into which the propellant, may be formed.
Figure 1B:
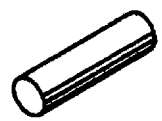
Figure 1C:
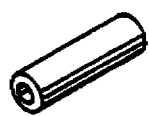
Figure 1D:
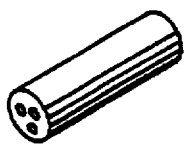
Figure 1E:
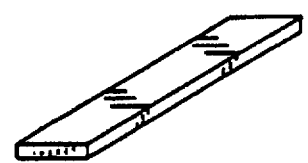
Figure 1F:
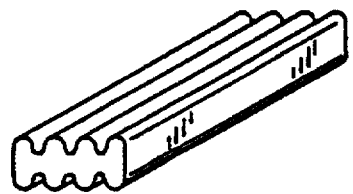
Figure 1G:
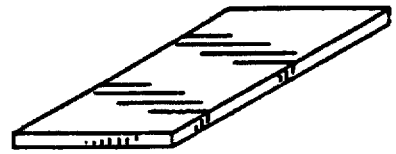

A chemical compound or mixture of compounds chemically balanced so that the only products are hot hydrogen and solid materials should show a velocity capability much higher than that shown by current propellants as a result of the high sonic velocity of hot hydrogen.

Accordingly, the present invention relates a propellant composition comprising an admixture of a first hydrogen rich material and a second metal material which is capable of reacting exothermically with the first hydrogen rich material where the ratio of the first hydrogen rich material to the second metal material is selected such that the exothermic reaction of the propel/ant forms a solid and a gas phase containing substantial amounts of hydrogen.

The type of chemical reaction necessary to produce a gas phase consisting of hydrogen and a solid is shown generally in equations 2 and 3;

$$HA+B \rightarrow H_2+AB(solid)+energy \quad (2)$$

or $$HA+H \rightarrow H_2+AB(solid)+energy \quad (3)$$

where the "A" compound represents the first hydrogen rich material and the "B" compound represents the second metal material.

Accordingly, in the context of the present invention, the first hydrogen rich material comprises material containing hydrogen and a second metal material comprises a material containing a metal compound wherein the first material and the second material are further defined as being capable of exothermically reacting together to form a gas phase containing substantial amounts of hydrogen and a solid phase.

By "substantial amount of hydrogen", it is meant that the gas phase contains an amount of hydrogen which is greater than that obtained with traditional gun propellants, for example at least about 50% by volume, preferably at least about 90% by volume of hydrogen. Accordingly, hydrogen is preferably the major component of the gas phase and more preferably, the gas phase comprises substantially pure hydrogen.

Examples of specific chemical reactions providing this type of behavior are illustrated below:

Although all reactions represented by (2) and (3) can be effective in the present invention, there are factors that prevent all reactions represented by the above equations from being equally preferred for use as gun propel/ants despite fulfilling the requirement of producing hot hydrogen and a solid. First of all, it is preferred that the amount of heat produced during the exothermic reactions is at least 400 cal/g of the admixture.

It is also more convenient that a gun propel/ant have the physical form of a stable solid that can be formed into shapes suitable for loading in cartridge cases. Accordingly, solid materials are preferred for use in the present invention. Furthermore, either one or both these first and second materials are preferably in a finely divided or powdered form.

In addition, it is preferred that the first hydrogen rich material comprise a material capable of providing nitrogen upon the decomposition thereof, and the second metal material comprises a material capable of reacting exothermically with the nitrogen generated by the decomposition of the first material, such that the solid phase comprises a solid nitride of the second metal material.

A number of preferred compounds are available that have adequate stability and thermochemical properties to provide the desired solid formulation providing a gas phase comprising hydrogen gas, a solid, and large quantities of heat. Tables 3, 4, and 5 display a number of these preferred compounds.

TABLE 3

First Hydrogen Rich Material, "A" Compounds, Reaction #2 or # 3

| Compound | Formula | Melting Point | Specific Gravity | Heat of Formation |
|---|---|---|---|---|
| Ammonium Nitrate | $NH_4NO_3$ | 169.6° | 1.725 | −87.27 |
| Ammonium Nitrite | $NH_4NO_2$ | 60–70* (exp) | 1.69 | −63.1 |
| Hydroxylamine Nitrate | $NH_4ONO_3$ | 48° | | −86.3 |
| Hydrazine Nitrite | $N_2H_5NO_3$ | 62.9° | | ca −59. |
| Hydrazine Dinitrite | $N_2H_6(NO_3)_2$ | 80° | | ca −75. |
| Ammonium Azide | $NH_4N_3$ | 230° | 1.346 | +27 |
| Hydroxylamine Azide | $NH_4ON_3$ | | | ca +28 |
| Hydrazine Azide | $N_2H_5N_3$ | 75.4° | 1.76 | ca +55. |
| Azoamide | $NH_2N_3$ | | | ca +60. |

TABLE 4

Second metal material "B" Compounds, Reaction # 5

| | | Melting | | Heat of Formation | |
|---|---|---|---|---|---|
| | Formula | Point | Specific Gravity | Oxide | Nitride |
| Aluminum | Al | 660° | 2.7 | −400. | −57.7 |
| Boron | B | 2300° | 2.35 | −300. | −60.3 |
| Titanium | Ti | 1660° | 4.50 | −218. | −73. |
| Magnesium | Mg | 649° | 1.75 | −143.8 | −110.24 |
| Calcium | Ca | 840° | 1.54 | −151.9 | −103.2 |
| Lithium | Li | 180° | .534 | −142.4 | −47.2 |

TABLE 4-continued

Second metal material "B" Compounds, Reaction # 5

| | | Melting | | Heat of Formation | |
|---|---|---|---|---|---|
| | Formula | Point | Specific Gravity | Oxide | Nitride |
| Zirconium | Zr | 1852° | 6.49 | −258.2 | −82.2 |
| Silicon | Si | 1410° | 2.32 | −205. | −179. |
| Beryllium | Be | 1278° | 1.85 | −143. | −135.7 |

TABLE 5

Second metal material, "B" Compounds, Reaction #3

| Compound | Formula | Melting Point | Specific Gravity | Heat of Formation |
|---|---|---|---|---|
| Aluminum Hydride | AlH$_3$ | d 100 | ca 1.3 | ca −3 |
| Decarborane | B$_{10}$H$_{14}$ | 99.5 | .94 | +8 |
| Titanium Hydride | TiH$_2$ | d 400° | 3.9 | ca −5 |
| Magnesium Hydride | MgH$_2$ | d 280° | 1.45 | −18 |
| Calcium Hydride | CaH$_2$ | d 600 | 1.9 | −45.1 |
| Zirconium Hydride | ZrH$_2$ | d 400° | | ca −5 |
| Magnesium Aluminum Hydride | Mg(AlH$_4$)$_2$ | d 140° | 1.63 | −23.1 |
| Lithium Hydride | LiH | 680° | .82 | −21.6 |
| Lithium Aluminum Hydride | LiAlH$_4$ | d 125° | .917 | −24.1 |
| Lithium Borohydride | LiBH$_4$ | 277° | .66 | −44.6 |
| Beryllium Hydride | BeH$_2$ | | ca .6 | ca +10 |

The compounds in Table 3 can be combined with compounds from Tables 4 or 5 to produce a desired mixture, for example:

(4) $NH_4NO_3 + 4Al \rightarrow 2H_2 + AL_2O_3(solid) + 2AlN(solid)$ (5) $N_2H_6(NO_3)_2 + 6Si \rightarrow 3H_2 + SiO_2(solid) + Si_3N_4(solid)$ (6) $2NH_4ON_3 + 9ZrH_2 \rightarrow 13\ H_2 + 8\ ZrN(solid) + ZrO_2(solid)$ (7) $N_4N_3 + 4TiH_2 \rightarrow 6H_2 + TiN(solid)$ Reactions 4, 5, 6 and 7 are four of the potential large number of combinations that can be made by combining preferred first materials from Table 3 with the preferred second materials from Table 4 or 5.

In addition, to obtain mixtures with the desired thermochemical and physical properties it may be desirable to combine a multiplicity of compounds from Table 3 with a multiplicity of compounds from Table 4 or 5 across a spectrum of mixture ratios. These mixtures would be balanced to provide a gas phase product containing substantial amounts of hydrogen and a solid.

A preferred embodiment of the invention involves the use of ammonium azide as the first hydrogen rich material.

Ammonium azide has the following properties:

| Chemical Formula | NH$_4$N$_3$ |
|---|---|
| Density | 1.346 g/cc |
| Color Form | White crystals |
| Melting Point | 230–240° C. |
| Heat of Formation | +27.0 Kcal/mole |
| Vapor Pressure | 3.62 mmHg @ 40° C. |
| | 6.31 mmHg @ 60° C. |
| | 36.7 mmHg @ 80° C. |

Ammonium azide decomposes at about 300K to produce an equimolar mixture of hydrogen and nitrogen at 1232K. This reaction may be illustrated as follows:

$$NH_4N_3 \rightarrow 2N_2 + 2H_2 \quad (8)$$

Moreover, when ammonium azide is mixed with a metal material capable of forming a metallic nitride, the ensuing reactions, such as that generally illustrated by equations (2) and (3), may be illustrated as follows:

$$NH_4N_3 + 4M \rightarrow 4MN(solid) + 2H_2 \quad (9)$$

$$NH_4N_3 + 4MH \rightarrow 4MN(solid) + 4H_2 \quad (10)$$

Comparing reactions (9) and (10) to the reaction (8) it will be seen that a difference can be found in the formation of the metallic nitride. All metallic nitrides are solids with relatively high boiling points. The formation and condensation of the metallic nitride is a highly exothermic reaction. Consequently, the hydrogen generated by the reaction is heated to a very high temperature. This high temperature hydrogen serves as the working fluid which can drive the projectile to very high velocities.

There are various metals that react exothermically with nitrogen to form the corresponding metallic nitride. Examples of these metals and their nitrides are shown below in Table 6, along with the values Of the energy released by formation.

TABLE 6

Metals Forming Exothermic Nitrites

| | Nitride | Heat of Formation (Kcal/mole) | Heat of Formation per Nitrogen Bond | Heat of Formation per Gram | Boiling Point (Kelvin) |
|---|---|---|---|---|---|
| Beryllium | $Be_3N_2$ | −135.7 | −67.9 | 2.47 | 2500 |
| Magnesium | $Mg_3N_2$ | −110.2 | −55.1 | 1.09 | 970 |
| Calcium | $Ca_3N_2$ | −103.02 | −51.6 | 0.70 | >2200 |
| Boron | BN | −32.1 | −32.1 | 1.29 | 3200 |
| Aluminum | AlN | −57.7 | −57.7 | 1.41 | 2270 |
| Titanium | TiN | −73.0 | −73.0 | 1.19 | >3600 |
| Zirconium | ZrN | −82.2 | −82.0 | 0.78 | >3600 |
| Lithium | $Li_3N$ | −47.2 | −15.7 | 1.35 | 1000 |
| Silicon | $Si_3N_4$ | −179.3 | −44.8 | 1.07 | >2200 |

The strongest reaction with nitrogen will be provided by that compound which has the highest heat of formation per nitrogen bond. Moreover, because nitrides are reported not to exist in the gas phase and visually the entire reaction energy is released upon formation of the condensed phase, it is desirable that the nitride have as high a boiling point as possible. It is thus the combination of these two parameters, high heat of formation and high boiling point, that will yield the highest possible reaction temperature.

From a practical standpoint, the metal selected should be relatively inert to reactions at room temperature, to allow safe and easy handling and formulation. Moreover, the material should be relatively non-toxic, for these same reasons. In addition, the material should be readily available at a cost that is not prohibitively expensive.

Based upon the foregoing considerations, boron and titanium appear to be the best choices for use as a metal for use in combination with the ammonium azide.

Moreover, thermochemical computer calculations indicate that when boron or titanium is reacted with ammonium azide, a peak temperature for the gas phase of about 3500 and 4150 Kelvin, respectively, would be generated, and hydrogen would be the only significant gas phase product.

Because of other practical considerations such as convenience to the user and simplicity of gun design reaction with materials, the mixture illustrated in reaction (7), i.e., ammonium azide mixed with titanium hydride is a more preferred embodiment according to the present invention. The physical properties of titanium hydride are illustrated below.

Properties of Titanium Hydride

| | |
|---|---|
| Chemical Formula | $TiH_2$ |
| Density | 3.90 grams/cc |
| Color & Form | Metallic gray powder |
| Melting Point | Decomposes to $Ti + H_2$ at 400° C. |
| Heat of Formation | −32 Kcal/mole |
| Water Solubility | insoluble |

These ingredients can be blended at a variety of ratios with a preferred molar nitrogen to titanium ratio of 1:1 (i.e., about 23.11% by wt. ammonium azide and about 76.89% by wt. titanium hydride) to give a propellant mixture. Theoretical thermochemical calculations indicate this mixture will react to produce a mixture of hydrogen gas and titanium nitride solid at a temperature of 3567° Kelvin.

A preferred high velocity propellant according to the present invention is made by intimately admixing the first hydrogen rich material, preferably powdered ammonium azide and the second metal material, preferably powdered boron, titanium or titanium hydride, or a mixture of 2 or 3 of the metal containing compounds and compressing this mixture at high pressure into suitable shapes.

While the present invention is discussed in terms of a preferred embodiment comprising the ammonium azide and titanium hydride, the discussions are equally applicable to other embodiments of the invention.

The relative proportions between the first hydrogen rich material and the second metal material should be approximately those which will satisfy the stoichiometry of equation (9) or (10) set forth above (i.e., the production of only hydrogen and solids). An excess of certain first hydrogen rich materials, i.e., azides, can result in generation of nitrogen in excess of the amount that can react with the metal to form the corresponding nitride. Thus a greater volume of gas would be produced, but at a lower temperature and an increased molecular weight, as there would be less nitride formation to heat the gas and some nitrogen would remain in the gas phase. This may be useful in some applications where it is desired to use a smaller charge of propellant to produce a gas that is somewhat cooler per unit volume, thereby to reduce gun bore erosion at a lower peak velocity. An excess of second metal material, on the other hand would drive the nitride formation reaction even more strongly to the right, leaving unreacted metal without producing more energy or hydrogen. It is accordingly preferred to use a stoichiometric mount or slight excess of azide relative to metal material.

Because the preferred materials in Tables 3, 4, and 5 do not always have ideal physical properties from which to fabricate propellant grains, it may be desirable to add small amounts of polymeric binder materials to improve the physical properties of the pressed or extruded propellant grains. Other materials such as plasticizers, solid whiskers, lubricants, or electrical conductive materials may be added to enhance the physical properties of the formulations for specific use. Surface coatings may be utilized to prevent volatilization of components of the mixture.

The rate of deflagration of the particles is preferably controlled to tailor the pressure rise rate during gun firing. This can preferably be accomplished in two ways. First, the physical size and shape of the pressed or extruded particles can be controlled to produce plates, cylinders, cylinders with one or more perforations or sphere of various sizes. The surface area exposed will control the initial burning rate while the thickness will control the sustained burning rate. For this physical modification method, processes such as those employed in the manufacture of standard nitrocellulose propellant can be utilized.

The burning rate may also be controlled by selections of the appropriate particle size of the components of the mixture. Particles react primarily on their surface. Very large particles have a relatively small surface area for their mass, while small particles have a large surface area. As a result of the surface area effects, small particles will be selected when a high burning rate is desired, and large particles will provide a lower burn rate. For specific applications it may be desirable to use particles having a wide range of particle sizes or with a specific group of particle size ranges. The proper selection of particle size will allow the burning rate to be accurately controlled over a wide range.

The burning rate of these propellant mixture can be controlled by the addition of catalysts and inhibitors. For example, pure ammonium azide from of heavy metals does not detonate, but cuptic azide is a very impact sensitive explosive. Ammonium azide mixtures can be catalyzed to react at much higher rates by addition of 10–1000 parts per million of copper. Small quantifies of lead, mercury, and thallium may also be used as rate accelerators. Cooper, iron, and chromium salts are known to increase the reaction rates of ammonium nitrate mixtures. Moreover, materials such as polymeric binders, wax, and fumed silica should depress the reaction rate.

All of the formulations produced by proper blending of materials according to the present invention, such as those in Table 3 with those in Tables 4 and 5, with or without additives for burn rate and/or physical property control, are useful as gun propellant formulations and will provide higher velocity capabilities than current propellants. These formulations will also find use in other applications where current gun propellants are used, for example, explosives, rocket propellants, gas generator propellants, flare formulations and pyrotechnics.

For use as gun propellants the mixture of ingredients will be pressed, extruded or molded into shapes suitable for loading into cartridges or guns as shown in FIGS. 1a–g. Examples of the shapes include spherical, 1a; cylindrical, 1b; cylindrical with perforation, 1c; cylindrical with multi-perforations, 1d; strips, 1e; contoured strips, 1f; and plates, 1g. The size and shape of the propellant grains will be utilized to aid in control of the deflagration rate. Small grains with perforations to provide an increased surface area will react more rapidly while large grain will react more slowly.

The ingredients used in formulating the grains will comprise a first hydrogen rich material and a second metal material such as those shown in Table 3, 4, and 5 with or without other substances. The other substances added will alter the physical properties or deflagration rate of the propellant grains to match them to the requirements. The individual grains may be coated to stabilize the physical properties, prevent evaporation of components or to protect the grains during handling.

The grains can be loaded into cartridge cases made of suitable compatible materials. For the preferred propellant, ammonium azide—boron, titanium or titanium hydride, construction materials selected for contact with the propellant must not contain catalytic metal with which ammonium azide can react to form impact sensitive metal azides.

Metals of particular importance in the use of pure explosive stable ammonium azide containing propellants are periodic table column IB elements, copper and silver; column IIB elements, zinc, cadmium and mercury; column IIIA element, thallium; and column IVA element, lead. Sensitivity to the influence of these metals is so extreme that when pure ammonium azide, showing no impact sensitivity in contact with pure aluminum, is tested in contact with copper; it becomes more impact sensitive than ammonium perchlorate.

Figure 2:
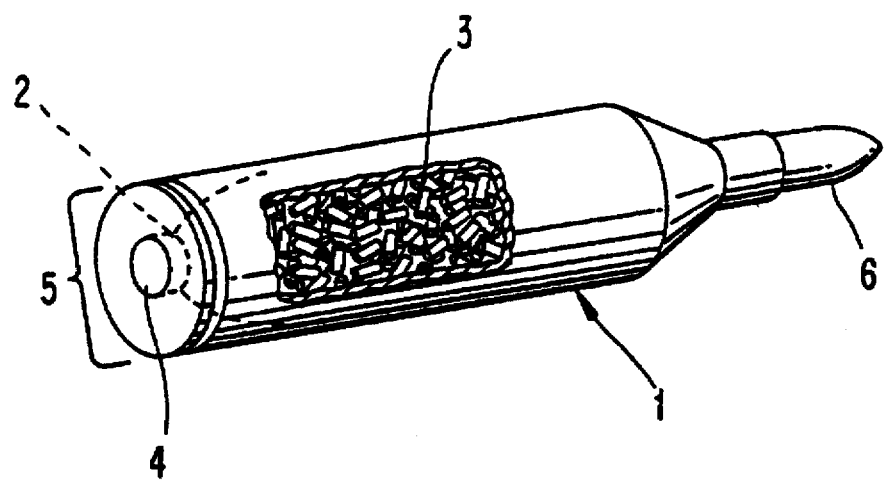

Cartridge cases 1 as shown in FIG. 2 fabricated from brass would be suitable for all formulations that do not contain azides, such as sample reactions 4 and 5. For those mixtures that contain azide, such as sample reactions 6 and 7, FIG. 2 cartridge cases must be fabricated from any recognized metal which is compatible with azides. Mild steel is suitable but may suffer from environmental corrosion. For example, mild steel with a dense plating of nickel or chromium would be suitable and would not corrode from environmental effects. Pure nickel and stainless steel alloys would be suitable for even those mixtures containing azides.

When azide formulations are used, a vapor barrier 2 must be installed between the chamber holding the azide 3 containing high velocity propel/ant and the primer 4. This barrier will prevent azide vapors from contacting the primer formulation and changing its characteristics. The barrier 2 can be formed from a thin, e.g., 0.001–0.005 inch thick sheet of any material compatible with the ammonium azide vapor. For example, aluminum, stainless steel or a plastic barrier would all be suitable.

Figure 3:
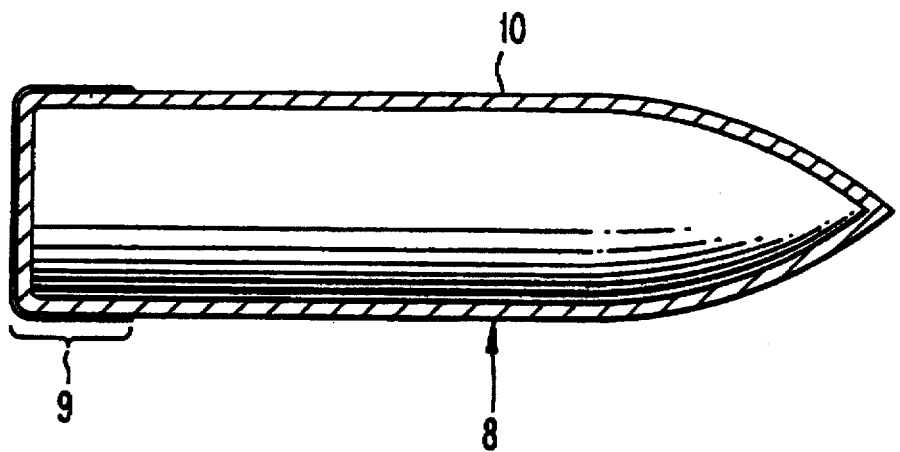

For azide containing propellants the base 5 of the projectile 6 must also be made from an azide compatible material. This will be necessary with lead projectiles and copper jacketed projectiles. Any pore free coating ("8" of FIG. 3) of a compatible material would be suitable. For example, a copper jacketed projectile ("10" of FIG. 3) could be nickel plated ("9" of FIG. 3) on its base as shown in FIG. 3.

For guns using separate loading of the propel/ant containing cartridge and the projectile, the cartridge can be designed to the same criteria as mentioned above for the single unit cartridge.

Very large guns use bag loading of the propellant. Bag loading can be used with high velocity propel/ants of the present invention. All of the preferred components in Table 3 are water soluble and several have appreciable vapor pressures. Because of these properties, water and vapor proof plastic bags should be employed to contain the propellant. This technique is illustrated in FIGS. 4a and 4b.

These bags can either have heat sealed bottoms 11 and tops 12 or the top can be crimp sealed 12. Moreover, the size of the bags is not critical and depends on the purpose of the bag. For example, for bags to be used in large bore guns, i.e., FIG. 4a, the bags can have a 5–16 in diameter while those bags used in rim fire weapons, FIG. 4b, can have a 0.20 in. diameter.

To obtain the maximum advantages of the high velocity propel/ant it is preferred to use relatively light weight projectiles. For minimizing the velocity loss due to air resistance after the projectile is launched, it is desirable to have a projectile with a large mass per unit frontal area. A large bore is desirable to provide the maximum surface area at the base of the projectile on which the propellant gas can act. These conflicting requirements, light projectiles with low frontal area and large bore area, can be met by the technique of a subcaliber projectile ("16" of FIG. 5) carried by light sabot ("15" in FIG. 5) that can be discarded at the muzzle. Such a projectile is illustrated in FIG. 5 which is sized for a 105 mm cannon. The large diameter sabot seals the barrel and provides the large surface area necessary for the gas to react against to accelerate the projectile. As the projectile-sabot exits from the bore the sabot is designed to break up and separate from the projectile the small dense projectile continues on the target.

A long rod penetrator such as is shown in FIG. 4 is also very effective against armored vehicles. For a projectile traveling at a velocity of 9000 ft/sec or greater, the depth of penetration is approximately given by the expression:

$$D = L\left(\frac{S_P}{S_T}\right)^{1/2}$$

where D is the depth of penetration, L is the length of the penetrator, $S_p$ is the specific gravity of the penetrator and ST is the specific gravity of the target. For the assumed rod penetrator fabricated from depleted uranium $S_p$=18.68. Steel armor has a variable specific gravity depending on its composition but a value of 8.0 is representative. The penetrator shown in FIG. 4 has a length of 12 inches. Penetration depth is:

$$D = 12.5 \left(\frac{18.68}{8}\right)^{1/2} = 19.1 \text{ inches}$$

This penetration depth is sufficient to defeat most armored vehicles. The lower density of concrete would result in this penetrator defeating 34 inches of concrete, a depth sufficient to defeat many concrete structures.

Recently many advance armors have used multiple layers of steel, ceramics and aluminum as a defense against shaped charge armor piercing weapons. This is effective against the shape charge but, because of the dependency of the rod penetrator effectiveness on only specific gravity ceramics and aluminum are actually more vulnerable to rod penetrators than an equal thickness of steel.

The high velocity propellants will provide a technology able to allow conventional guns to be highly effective against a whole new spectrum of targets at greatly increased ranges and altitudes.

The high velocity propel/ant according to the present invention will, like black powder, be quite smoky. It will also produce a bright flash when the hot hydrogen and titanium nitride ignite and burn in the oxygen of the air after the bullet leaves the barrel. The high temperature and the presence of solids in the gas will also make the propellant erosive.

Moreover, the high velocity propellant according to the present invention produces only one-half the volume of gas per volume of propellant as do nitrocellulose propellants. Thus, for a given chamber pressure it will be necessary to use twice the volume of propellant according to the present invention. This is again similar to black powder. The consequence of this is a somewhat larger cartridge case to achieve a similar chamber pressure behind a fixed weight bullet.

If desired, the ammunition according to the present invention can also incorporate a primer composition to provide for more rapid decomposition of the ammonium aide. It is contemplated that such a primer may comprise an azide or fulminate, such as copper azide or mercury fulminate, as is known to those skilled in the art. In the case where the fulminate comprises a material with which the ammonium azide is reactive, it will be necessary to segregate the fulminate from the ammonium azide, for example by disposing a heat degradable membrane between the two compounds at the percussion end of the ammunition.

Many of the hydrogen rich compounds are conductive salts. Addition of metals will make the propellant compositions more electrically conductive. The electrical conductivity will make it possible to effect ignition by forcing an electric current directly through the propel/ant. The flow of current will raise the propellant to its ignition temperature.

In order to further illustrate the present invention and the advantages associated thereof, the following examples are given, it being understood that same are intended solely to illustrate and in nowise limitative.

EXAMPLES

EXAMPLE 1

(A) One figure of merit for analysis of a gun propellant is the impetus (F). It is a value indicating the specific performance potential and is defined:

$$F = R\frac{T}{M} \qquad (11)$$

where R is a constant with a value of 2,780 ft-lbs/mole degree Kelvin, T is reaction temperature in degrees Kelvin and M is molecular weight of the propellant gas. The appropriate values for nitrocellulose, black powder, ammonium azide—titanium hydride, and ammonium azide—titanium propellants are shown in Table 8.

TABLE 8

Gas Propellant Impetus (Gas Phase Only)

| Propellant | Temperature | Molecular Weight | Impetus | Solids Vol % | Wt % |
|---|---|---|---|---|---|
| Nitrocellulose | 2867 | 25.98 | 307,800 | 0 | 0 |
| Black Powder | 2120 | 36.5 | 161,000 | .0095 | 51.2 |
| Ammonium Azide/Titanium Hydride | 2945 | 2.015 | 4,063,000 | .0033 | 95.3 |
| Ammonium Azide/Titanium | 4150 | 2.015 | 5,725,000 | .0070 | 98.4 |

By application of a complex computer code including factors such as chamber pressure, temperature, gas compressibility, bore length, projectile friction, gas gamma, the performance of nitrocellulose and ammonium azide-titanium hydride propel/ants were compared. The results of this comparison are shown in Table 9.

TABLE 9

Theoretical Velocity Calculations For Nitrocellulose and Ammonium Azide Titanium Hydride Propellants

| Projectile Weight (grams) | 20 | 10 | 5 | 2 | 1 |
|---|---|---|---|---|---|
| Propellant | Velocity ft/sec | | | | |
| Nitrocellulose | 2405 | 3294 | 4406 | 6138 | 7523 |
| Ammonium Azide/ Titanium Hydride | 3882 | 5466 | 7661 | 11813 | 16087 |
| % Increase | 161 | 167 | 174 | 192 | 214 |
| Gun Parameters | | | | | |
| Bore Diameter | 0.460 in | | | | |

TABLE 9-continued

Theoretical Velocity Calculations
For Nitrocellulose and Ammonium Azide
Titanium Hydride Propellants

| Bore length | 30 in |
| Chamber Volume | .385 in$^3$ |
| Pressure | 3600 atmosphere (53000 psi) |

As indicated above the velocity obtained with ammonium azide titanium hydride propel/ant is much higher than that obtained with nitrocellulose propellant at constant chamber pressure. Table 9 also indicates that the velocity improvement is greater with light projectiles than with heavy projectiles.

Figure 9:
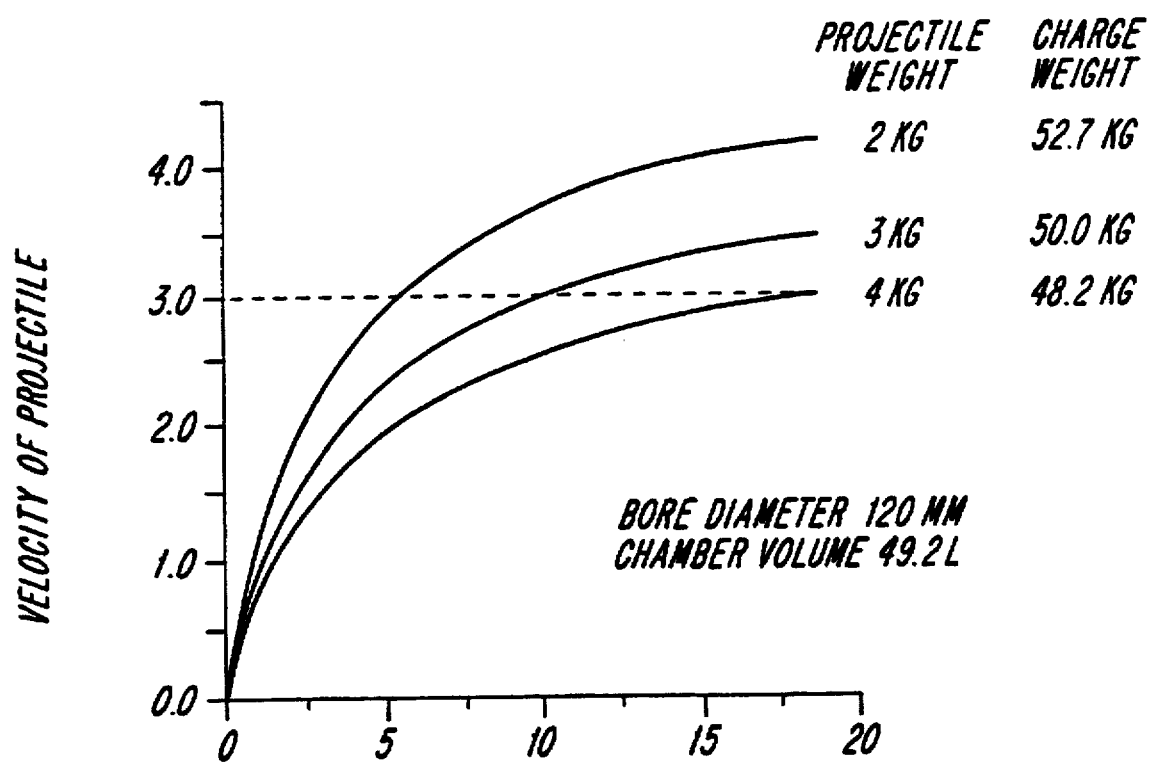

Further indication of the effect of the weight of the projectile is shown in FIG. 9 which illustrates a plot of the velocity (in km/sec) versus barrel length for a 120 mm gun firing 2, 3 and 4 kilogram projectiles.

(B) The calculations shown above are for the preferred embodiment where the reaction is balanced to provide only hydrogen and solids. In addition, other mixture ratios of components, through the use of a wide spectrum of propellants with various molecular weight gas, temperature, and solids content can be provided.

For example, the ammonium azide titanium hydride mixture has less solids that does black powder on a volumetric basis but still has a considerable solids content.

A mixture balanced is illustrated by equation 12:

$$NH_4N_3 + 2TiH_2 \rightarrow 4H_2 + N_2 + 2TiN(solid) \quad (12)$$

37.57% Ammonium Azide
62.43% Titanium Hydride

Such a mixture would have a gas phase molecular weight of 7.2, a temperature of about 2200° K. and only about ½ the volume of solids of the ammonium azide/titanium hydride mixture in Table 8. This molecular weight and temperature would lead to a impetus of 850,000, which is still a large improvement over nitrocellulose propellant illustrated in Table 8.

EXAMPLE 2

(A) A comparison of a propel/ant according to another embodiment of the present invention where titanium is used as the particulate metal in admixture with ammonium azide, to conventional black powder and nitrocellulose can be made by introducing the appropriate values into equation (1) relating to sonic velocity. The results are as follows:

TABLE 10

| | τ | M | cm/sec | ft/sec | T |
|---|---|---|---|---|---|
| Nitrocellulose | 1.22 | 25.9 | 106,000 | 3,480 | 2867 |
| Black Powder | 1.21* | 34.7 | 88,000 | 2,890 | 2650 |
| Ammonium Azide-Titanium | 1.22* | 2.0 | 456,000 | 14,960 | 4100 |

*Gas phase only, neglecting the solids

The calculated values for the two conventional gun propellants correspond to values reported for actual gun firings. Accordingly, it is to be expected that the values calculated above for the high velocity propellant according to the present invention will also be largely accurate.

As can be seen from the above Table 10, the theoretical velocities that can be attained using the propellant according to the present invention are higher than the velocities that can be attained using conventional propellants. The ability to achieve a muzzle velocity in the range of 15,000 feet per second is not simply an improvement over existing arms and ammunition, but opens up a wholly new weapon operating regime.

(B) These velocities can be translated into an approximation of the corresponding theoretical distances to which a projectile can be propelled using the propellant according to the present invention, as follows:

TABLE 11

GUN PERFORMANCE
(FLAT EARTH - NO AIR RESISTANCE)

| Velocity | Mach. No | Range Ft. | Range Km | Time to Range (sec) | Maximum Altitude (ft.) | Time to 100,000 ft. (sec) |
|---|---|---|---|---|---|---|
| 2,000 | 1.8 | 125,000 | 38.1 | 88.4 | 62,000 | — |
| 5,000 | 4.5 | 781,000 | 238.0 | 221.0 | 390,000 | 22.9 |
| 15,000 | 13.6 | 7,031,000 | 2,143.0 | 662.9 | 2,400,000 | 6.8 |

The flat earth-no air assumption is a simplification, but it provides a method of comparing the improvement in distance possible using the high velocity propellant according to the present invention. Conventional artillery has a range comparable to that of intermediate range ballistic missiles, and the capability to attack satellites in orbit at several hundred miles. The short time to ascent to 100,000 feet provided by the propellant according to the present invention would make these weapons useful against very high flying aircraft or re-entering ballistic missiles.

EXAMPLE 3

The theoretical effectiveness of the sabot projectile illustrated by FIG. 5 was determined.

Figure 6:
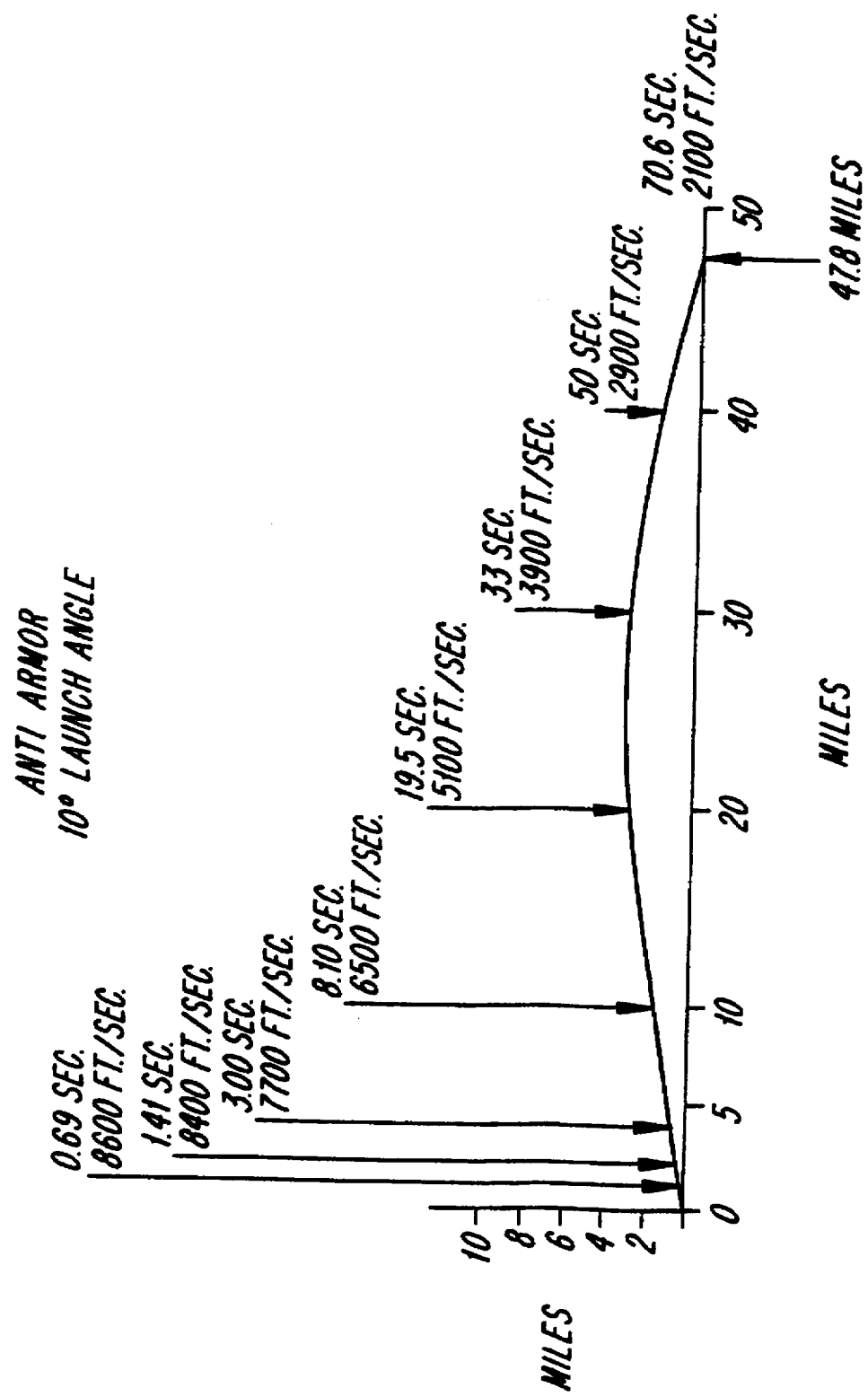
FIGS. 6–9 illustrate the superior performance which can be associated with the propellant of the present invention.
Figure 7:
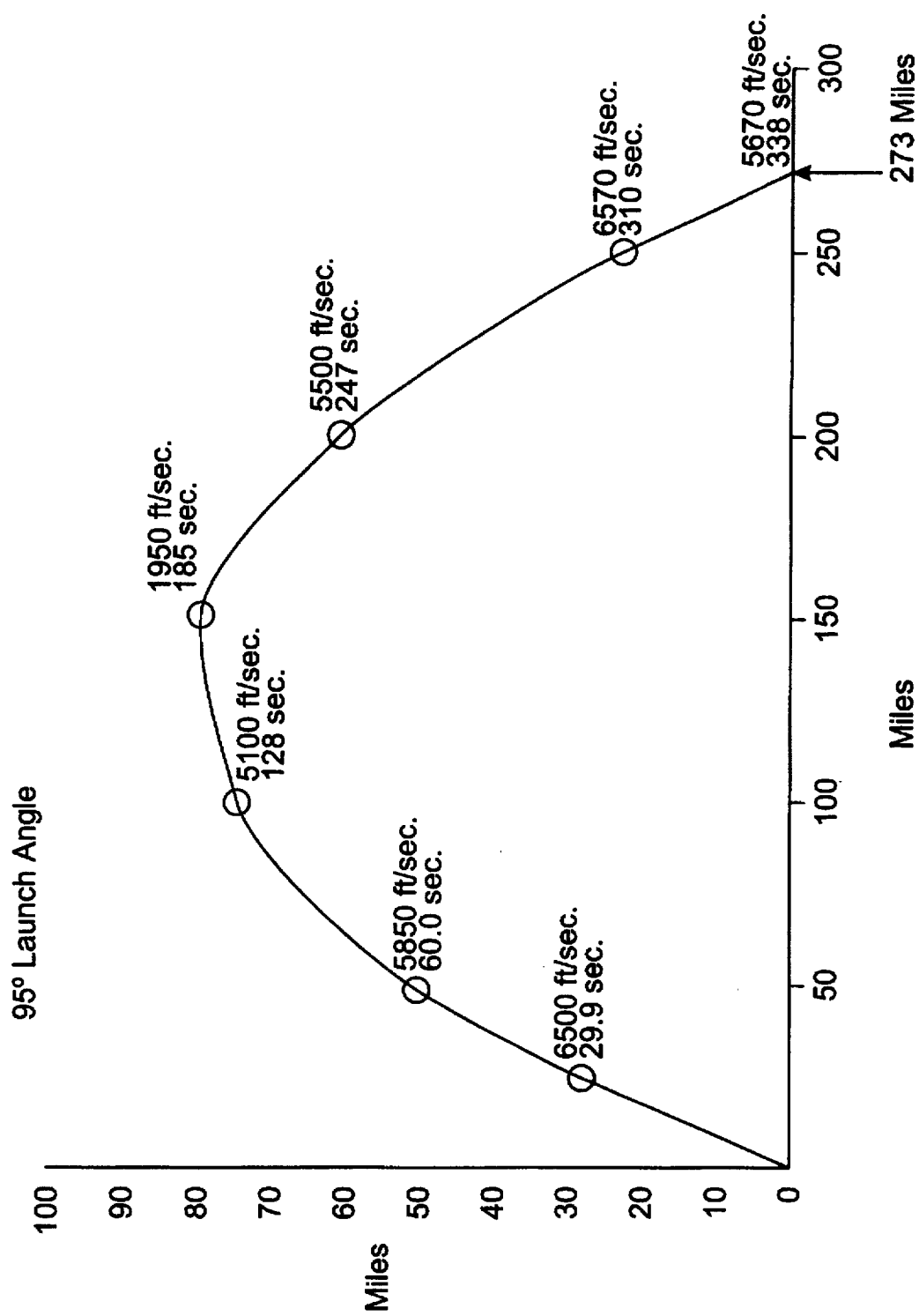
Figure 8:
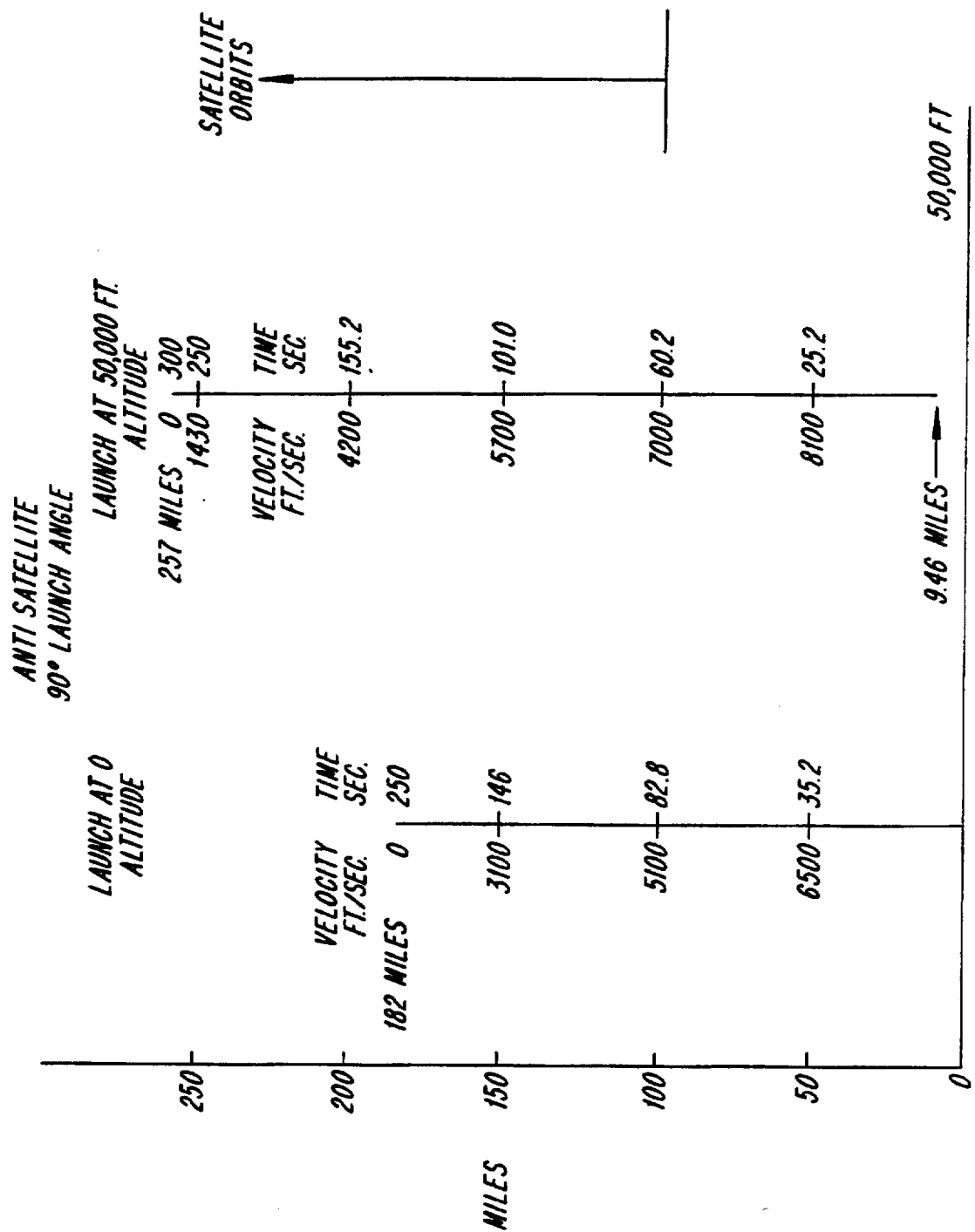

The velocity performance of the example propellant, ammonium azide-titanium hydride, was calculated assuming of 46,000 psi chamber pressure for the 12 lb sabot projectile (having a projectile weight of 8 lbs and a sabot weight of 4 lbs) combination shown in FIG. 5. The predicted theoretical velocity is 9047 f/sec. The trajectory of the eight pound projectile was calculated for a 10° launch angle, a 45° launch angle and a 90° launch angle. These calculations take into account the air drag at the various altitudes the projectile passes through and gravity effects. The results of these trajectory calculations are shown in FIG. 6, 7, and 8. The long range, short flight time and high altitudes indicated by these trajectories would allow the 105 mm cannon to be effective against a whole new class of targets. The high altitude and short slight time would allow this weapon to perform anti- satellite, anti-inter-continental ballistic missile defense and effectively attack very high flying aircraft.

Although the present invention has been described with reference to various preferred embodiments thereof, it will be appreciated that this has been done solely by way of illustration, and is not intended to limit the invention in any way. Instead, it is intended that the invention by construed within the full scope and spirit of the appended claims.

What is claimed is:

1. A method of propelling a projectile, comprising rapidly decomposing a charge of a propellant in a confined volume having an outlet opening, wherein a projectile is positioned within said volume between said charge and said opening, said propellant comprising ammonium azide, and a second material which comprises at least one of a metal, metal hydride, or silicon, where the ratio of ammonium azide to the second material is selected such that, upon reaction, the propellant forms a solid nitride and a gas phase coning substantial amounts of hydrogen.

2. The method according to claim 1 wherein the second material is selected from the group consisting of aluminum, titanium, magnesium, calcium, lithium, zirconlure, silicon, boron, beryllium, and mixtures thereof.

3. The method according to claim 1, wherein the second material is selected from the group consisting of aluminum hydride, decaboron, titanium hydride, magnesium hydride, calcium hydride, zirconlure hydride, magnesium hydride, aluminum hydride, lithium hydride, lithium aluminum hydride, lithium borohydride, beryllium hydride, and mixtures thereof.

4. The method according to claim 1, wherein the composition further includes hydra zinc azide, and the second material is selected from the group consisting of titanium, boron, titanium hydride, and mixtures thereof.

* * * * *